United States Patent [19]

Moran

[11] 3,955,085

[45] May 4, 1976

[54] THIN FILM TRITIUM DOSIMETRY

[75] Inventor: Paul R. Moran, Madison, Wis.

[73] Assignee: The United States of America as represented by the United States Energy Research and Development Administration, Washington, D.C.

[22] Filed: July 23, 1975

[21] Appl. No.: 598,275

[52] U.S. Cl. .............................. 250/336; 250/473
[51] Int. Cl.² ........................................ G01T 1/00
[58] Field of Search .......... 250/336, 337, 370, 371, 250/395, 472, 473, 484

[56] References Cited
UNITED STATES PATENTS 3,450,879  6/1969  Seppi ................................. 250/336

*Primary Examiner*—Davis L. Willis
*Attorney, Agent, or Firm*—Dean E. Carlson; Arthur A. Churm; Robert J. Fisher

[57] ABSTRACT

The present invention provides a method for tritium dosimetry. A dosimeter comprising a thin film of a material having relatively sensitive RITAC-RITAP dosimetry properties is exposed to radiation from tritium, and after the dosimeter has been removed from the source of the radiation, the low energy electron dose deposited in the thin film is determined by radiation-induced, thermally-activated polarization dosimetry techniques.

7 Claims, No Drawings

THIN FILM TRITIUM DOSIMETRY

CONTRACTUAL ORIGIN OF THE INVENTION

The invention described herein was made in the course of, or under, a contract with the United Stated Energy Research and Development Administration.

BACKGROUND OF THE INVENTION

This invention relates generally to radiation dosimetry techniques and is concerned particularly with dosimetry of low energy radiation. More particularly, the invention relates to dosimetry techniques for low energy beta radiation with particular emphasis directed toward tritium dosimetry. More specifically, the present invention is directed towards a dosimetry tehnique which employs the radiation-induced, thermally-activated polarization/radiation-induced, thermally-activated depolarization (RITAP/RITAD) phenomenon which occurs in dielectric materials.

The radiation-induced, thermally-activated current (RITAC) is a relatively recently discovered radiation-induced phenomenon occurring in dielectric materials, which has found useful application in radiation dosimetry techniques. This phenomenon was discovered in studies directed toward thermoluminescent dosimetry and thermally stimulated currents and, while somewhat related to these other phenomena, has been found actually to be a different and independent phenomenon in itself. The RITAC phenomenon as used herein is a general term which includes the RITAP and RITAD effects.

The RITAD phenomenon has been reported in a paper co-authored by the present inventor which appeared in *Physical Review Letters*, Vol. 29, No. 11, Sept. 11. 1972. The particular RIIAD phenomenon disclosed in this paper has come to be known as an external RITAD effect. In accordance with this effect and as reported in the above-mentioned paper, a stable electrical polarization is effected in a dielectric material when a RITAD dosimeter is exposed to radiation in the presence of an externally applied electric field. This polarization is proportional to the radiation dose absorbed by the dosimeter and can be subsequently read out as a function of depolarization current versus temperature as the dosimeter is gradually heated through an appropriate temperature range. The heating of the dosimeter raises the energy level of the dielectric material to the point of onset of ionic conductivity, at which point the radiation-induced polarization in the dielectric material becomes unstable and a depolarization current is generated. In the external RITAD technique the dosimeter, which includes a dielectric material disposed between polarizing electrodes, is preliminarily annealed to remove any stored energy which may be present in the dielectric material and the polarizing electrodes are grounded during cooling. A high external electric field is established across the two polarizing electrodes of the dosimeter during the exposure to radiation, consequently giving the name external RITAD, and subsequent to the exposure the polarizing electrodes are shorted through an ammeter during the readout. During the readout, the stable electrical polarization induced in the dielectric material by the radiation becomes unstable and generates a thermally-activated depolarization current as the dosimeter is heated through a characteristic temperature range and the radiation dose is determined by measuring or plotting the depolarization current versus temperature.

A related but somewhat different RITAP/RITAD effect was reported in a paper coauthored by the present inventor which paper appeared in *Science*, Vol. 179, pages 380–382, Jan. 26, 1973. This effect, which is referred to as the local RITAD effect, differed from the external RITAD effect in that no external electrical field was applied to the dosimeter during either radiation exposure or readout. Rather it was found that a high-temperature bias-polarization procedure produced an electric field within the material itself which produced a RITAD effect. In accordance with this technique, the polarizing electrodes of the dosimeter are tied into an electrical circuit during the annealing of the dosimeter. In this way, a high-temperature bias-polarization is induced in the dosimeter dielectric material prior to the exposure to the radiation. A high voltage is established across the electrodes as the dosimeter is heated to a high temperature, and the voltage is maintained across the electrodes while the dosimeter is cooled. The bias-poling voltage is removed after cooling and the dosimeter electrodes are shorted and grounded during exposure to the radiation and are grounded through an ammeter during readout. As a result of the bias-polarization pretreatment, the sample retains a very strong electret polarization which stable bias-polarization state produces local electric fields in the sample which give rise to the RITAD effect after irradiation, consequently giving the name local RITAD effect. During the subsequent readout following radiation exposure, the dose of radiation received by the dosimeter is again measured as the function of depolarization current versus temperature as the dosimeter is gradually heated through a characteristic temperature range. As the dosimeter reaches a sufficient temperature, it reaches the point of onset of ionic conductivity and depolarization of the established radiation-induced polarization occurs, giving the current readout. The depolarization current generated is proportional to the dose of radiation absorbed.

A better understanding of this phenomenon can be obtained from the more complete discussion of the subject contained in the two above-identified reports and the report "Radiation and Impurity-Induced Thermally Activated Charge Transport in Calcium Fluoride" by Ervin V. Podgorsak and P. R. Moran available as USAEC Technical Report C00-1105-184, which three reports are expressly incorporated herein by reference as though fully set forth.

It is an object of the present invention to provide a dosimetry technique for low energy radiations.

It is a particular object of the present invention to provide a dosimetry method for low energy beta radiation with particular emphasis directed toward tritium dosimetry.

Another object of the present invention is to provide a dosimetry method employing the highly sensitive RITAC techniques.

Other objects and advantages of the present invention will become apparent upon reading and consideration of the following description.

SUMMARY OF THE INVENTION

In acccordance with the dosimetry method of the present invention the dose level of low energy radiation can be determined by exposing a thin film formed from a material having relatively sensitive RITAC dosimetry properties to a source of low energetic radiation, and subsequent to removing the thin film from the radiation source, determining the low energy radiation deposited in the thin film by radiation-induced, thermally-activated polarization dosimetry techniques. A fuller understanding and appreciation of the present invention, as well as specific features of the invention, will be obtained upon reading the following description of the invention.

DESCRIPTION OF THE INVENTION

Experiments conducted during studies of thermoluminescent dosimetry showed that some thermoluminescent dosimeters exhibited a selective tritium beta radiation dosimetry effect. It was found that this selective effect was due to thermoluminescent states close to the dosimeter surface and the low energy tritium betas deposit their energy close to the solid's surface, typically 2 to 20 microns. Since RITAP sensitivity, unlike thermoluminescence, is thickness independent, studies were undertaken to determine whether advantage could be taken of this selective effect in applying RITAP dosimetry methods to tritium beta radiation dosimetry. It has been discovered that many polymer plastics which are stable to relatively high temperatures and remain good insulators also have relatively sensitive TAC-TAP type peaks which are quite long-lived at room temperatures. Consequently, the much more sensitive technique of the present invention was developed applying RITAP dosimetry methods to very thin films.

In accordance with the present invention a RITAP-type dosimeter is formed with a very thin film of a material having relatively sensitive RITAC-RITAP dosimetry properties serving as a dielectric material. The thin film is exposed to the weak beta radiation from tritium which radiation deposits in the thin film. After the thin film dosimeter is removed from the source of the tritium irradiation the low energy electron dose deposited in the film by the tritium is determined by radiation-induced thermally-activated polarization dosimetry techniques. Since the low energy tritium betas will deposit within a small distance, i.e. 2–20 microns into a solid surface, the film can be made extremely thin. Similarly, since the RITAP sensitivity is thickness independent, sensitivity is not effected by the use of a thin film. Irradiation dose deposited in the film is read out in accordance with the RITAP dosimetry techniques which have been described and are well known in the art.

It has been found that several polymer plastic materials which can be formed into thin films have relatively sensitive RITAP dosimetry properties and therefore are readily adaptable to use in the practice of the present invention. One particular polymer which has been found to be especially practical in the practice of the present invention is a methylpentene polymer. A particular methylpentene polymer, 4-methylpentene-1 polymer, available under the trademark TPX has proved to be particularly useful. Another polymer plastic having suitable TAC dosimetry properties is common Mylar (a registered trademark for polyethylene terephthalates) which is a commercially available polyester film.

While there are many potential applications of the tritium dosimetry method of the present invention, including physical contact between the dosimeter film and the surface of a tritiated solid, a particular application where the present dosimetry method may find particularly advantageous application is in the dosimetry of a tritium containing liquid. The polymer film can be exposed to tritium radiation from a liquid by immersing the film into the tritium containing liquid. The actual physical contact between the immersed film and the tritium source will give a highly accurate indication the tritium content in the liquid. A minor modification of this particular technique which could prove to be very advantageous would be to employ, as the polymeric plastic film, a material which is hydrogen rich and has hydrogen exchange properties. Upon immersion of the film into the tritium containing liquid, the film will undergo a tritium-hydrogen exchange with the material. The dosimeter will then become its own source of tritium activity and, even if removed from the tritiated environment, will retain a tritium concentration proportional to that in the tritiated environment. The tritium dose can then be determined from the self irradiation of the film from the retained tritium which will be proportional to the environmental tritium concentration. This particular application may prove to be extremely useful in tritium monitoring of water sources.

While various applications of the present technique are possible, health physics-type body tritium measurements would be one particularly desirable application, as well as the above-mentioned environmental water tritium monitoring measurements. Gaseous tritium monitoring is also an application to which the present invention is readily adaptable. While the present invention has been discussed primarily with respect to tritium dosimetry, in a wider view any low energy radiations, including X-rays or electrons, are selectively measurable by the thin-film type TAP dosimeter. In addition, heavy charged particles including alpha particles or heavy ions deposit their energy in a short distance even though they may be of relatively high energy. Since their energy deposited in a short distance into a solid, application of the present thin-film dosimetry technique is evident. In all such limited dose depth dosimetry problems, the thin film TAP approach should be applicable with a high degree of sensitivity.

The embodiments of the invention in which an exclusive property or privilege is claimed are defined as follows:

1. A tritium dosimetry method comprising: forming a thin film of a material having relatively sensitive RITAC-RITAP dosimetry properties; exposing said thin film to tritium radiation; removing said thin film from said tritium radiation; determining the low-energy electron dose deposited in the film by radiation-induced thermally-activated polarization dosimetry techniques.

2. The method of claim 1 wherein said material having relatively sensitive RITAC-RITAP dosimetry properties is a polymer plastic.

3. The method of claim 2 wherein said polymer plastic is a methylpentene polymer.

4. The method of claim 3 wherein said polymer is a 4-methylpentene-1 polymer.

5. The method of claim 3 wherein said polymer film is exposed to said tritium radiation by bringing said film into contact with a tritium containing material.

6. The method of claim 5 wherein said film is immersed into a tritium containing liquid.

7. The method of claim 6 wherein said polymer film is hydrogen-rich and has hydrogen-exchange properties, and said film undergoes a tritium-hydrogen exchange and the tritium dose is determined from the self irradiation of the film from the retained tritium which is proportional to the environmental tritium concentration.

* * * * *